No. 847,082. PATENTED MAR. 12, 1907.
L. KRUEGER, E. J. KINKLER & O. H. CARMICHAEL.
PIPE CLAMP.
APPLICATION FILED OCT. 6, 1906.
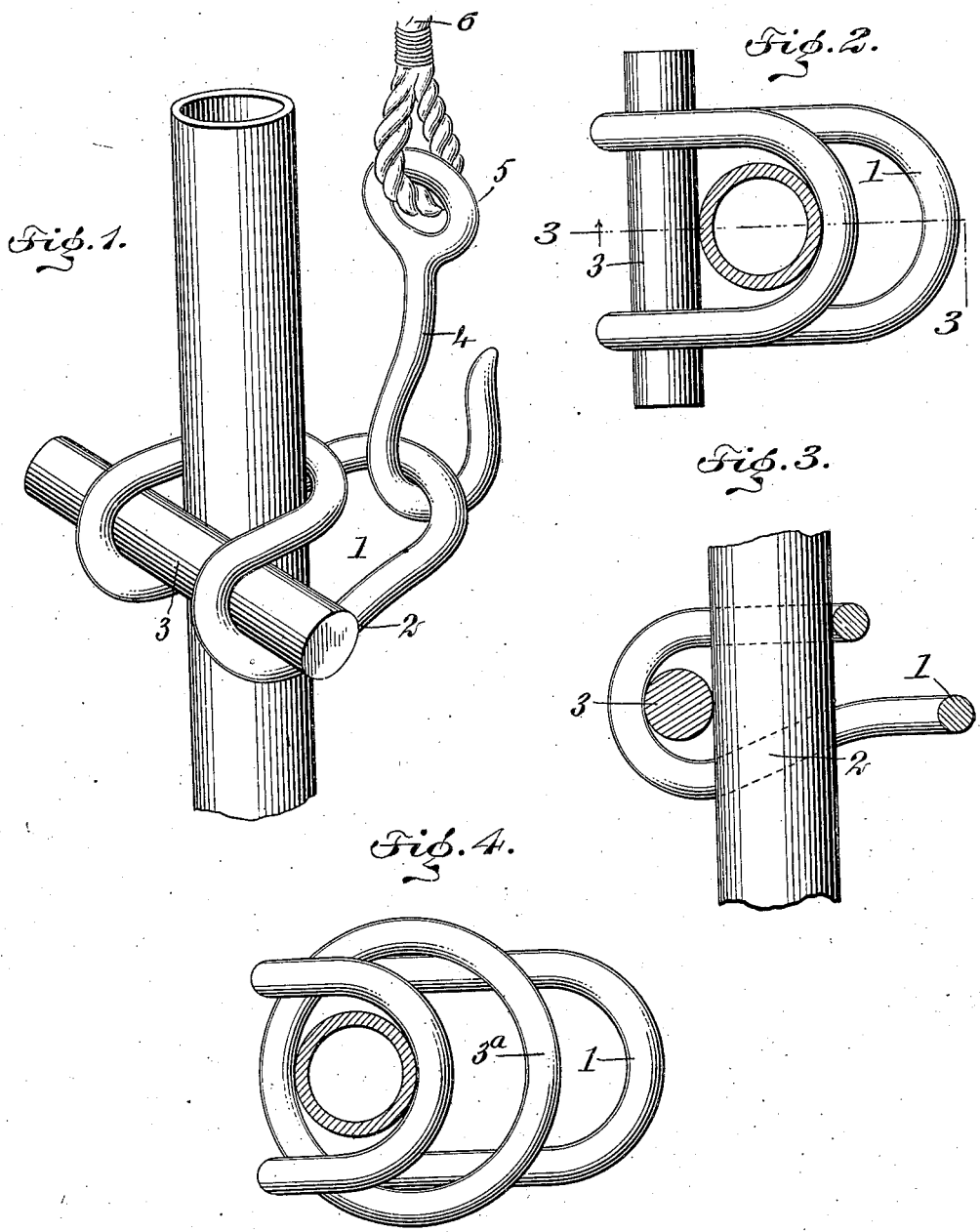
WITNESSES
INVENTORS
Louis Krueger
Emil J. Kinkler
Oscar H. Carmichael
BY
ATTORNEYS

UNITED STATES PATENT OFFICE.

LOUIS KRUEGER, EMIL J. KINKLER, AND OSCAR H. CARMICHAEL, OF BEEVILLE, TEXAS.

PIPE-CLAMP.

No. 847,082.     Specification of Letters Patent.     Patented March 12, 1907.

Application filed October 6, 1906. Serial No. 337,666.

*To all whom it may concern:*

Be it known that we, LOUIS KRUEGER, EMIL J. KINKLER, and OSCAR H. CARMICHAEL, citizens of the United States, and residents of Beeville, in the county of Bee and State of Texas, have invented a new and Improved Pipe-Clamp, of which the following is a full, clear, and exact description.

This invention is an improved pipe-clamp for lowering and raising tubes, especially well-casings, shafts, and the like.

Among other objects of the invention is the production of a device of this character of simplified construction which will when in operation automatically grip and tightly clamp the pipe or shaft and which can be readily removed therefrom when desired.

With these and other objects in view the invention consists of an oval metal ring resembling an ordinary chain-link which is bent transversely upon itself into hook shape, preferably at one side of its central line, thus forming one member of the hook longer than the other. A bar, ring, or other device is placed in the bend of the hook and the pipe passed through the two members thereof, the longer member of which is attached to a flexible line by a hook or other convenient means for lowering and raising the casing.

Reference is to be had to the accompanying drawings, forming a part of this specification, in which similar characters of reference indicate corresponding parts in all the figures.

Figure 1 is a perspective elevation of one embodiment of our improved clamp as applied to a pipe or well-casing. Fig. 2 is a plan view of the same, showing the pipe in section and with the means for raising and lowering it removed. Fig. 3 is a central sectional view substantially on the line 3 3 of Fig. 2; and Fig. 4 is a plan view of the clamp with the bar shown in Figs. 1 to 3, inclusive, removed and a ring substituted therefor.

The invention comprises an oval ring 1, preferably constructed of round iron or steel and resembling an ordinary form of chain-link. This is bent transversely upon itself at one side of its transverse center, forming it into substantially hook shape and making one member of the hook or ring longer than the other, the longer member being preferably provided with an offset portion 2, as best shown in Fig. 3, bringing the two members closer together at their outer ends. As shown in Figs. 1 to 3, inclusive, a bar 3 is passed transversely through the bend of the hook and acts to bind and clamp one side of the pipe, shaft, or the like after the same has been passed vertically through the two members of the hook, the shorter member of the hook serving to bind at the opposite side of the pipe and coacting with the bar when the weight of the whole is suspended from the longer hook member. This, as shown in Fig. 1, is preferably accomplished by an ordinary hook 4, having an eye 5 at its upper end, which is connected with a rope or other flexible connection 6. It is obvious from this construction that the heavier the pipe or shaft the tighter it is gripped between the short hook member and the bar.

In Fig. 4 is illustrated the preferred form of clamp differing only from the clamp shown in Figs. 1 to 3, inclusive, in that the metal bar 3 is replaced by a ring 3ª. This embodiment of our invention possesses some advantages over the structure hereinbefore described, among which may be mentioned that it conforms more to the cylindrical surface of the pipe, and therefore gives a greater bearing-surface. Further, it is not possible to remove the ring from the clamp as long as the pipe or shaft is in place therein, and accordingly the ring cannot be accidentally displaced from the clamp, as might sometimes happen in the case of the bar.

The precise embodiment of the invention is not material provided its essential characteristics are employed as pointed out in the annexed claims.

Having thus described our invention, we claim as new and desire to secure by Letters Patent—

1. A pipe-clamp comprising an oval ring bent into hook shape at one side of its transverse center, forming the hook into members of unequal lengths, the shorter member adapted to bind a pipe or the like at one side, means passing through the bend of the hook coacting with the shorter member for binding the pipe at its opposite side, and means connected to the longer member of the hook for raising and lowering the pipe.

2. A pipe-clamp comprising an oval ring bent into hook shape adapted to bind a pipe or the like at one side, and means passing through the bend of the hook to bind the pipe at its opposite side.

3. A pipe-clamp comprising a ring bent upon itself into substantially hook shape and an element seated in the bend for the purpose described.

4. A pipe-clamp comprising an oval ring bent upon itself into substantially hook shape at one side of its transverse center, forming the hook in two members of unequal length, and a member seated in the bend of said hook, for the purpose described.

5. A pipe-clamp comprising an oval ring bent into hook shape adapted to bind a pipe or the like at one side, and a ring passing through the bend of the hook to bind the pipe at the opposite side.

In testimony whereof we have signed our names to this specification in the presence of two subscribing witnesses.

LOUIS KRUEGER.
    E. J. KINKLER.
    O. H. CARMICHAEL.

Witnesses:
 T. T. Marsden,
 T. T. Eidson.